(12) United States Patent
Martin De Nicolas et al.

(10) Patent No.: US 10,063,643 B2
(45) Date of Patent: Aug. 28, 2018

(54) MEDIA STREAM GROUPING IN MULTIMEDIA COMMUNICATION NETWORKS

(75) Inventors: Arturo Martin De Nicolas, Aachen (DE); Morgan Lindqvist, Sundbyberg (SE)

(73) Assignee: TELEFONAKTIEBOLAGET LM ERICCSON (PUBL), Stockholm (SE)

( * ) Notice: Subject to any disclaimer, the term of this patent is extended or adjusted under 35 U.S.C. 154(b) by 777 days.

(21) Appl. No.: 14/131,411

(22) PCT Filed: Jul. 7, 2011

(86) PCT No.: PCT/EP2011/061462
§ 371 (c)(1),
(2), (4) Date: Jan. 7, 2014

(87) PCT Pub. No.: WO2013/004309
PCT Pub. Date: Jan. 10, 2013

(65) Prior Publication Data
US 2014/0136656 A1    May 15, 2014

(51) Int. Cl.
*H04L 29/08* (2006.01)
*H04L 29/06* (2006.01)

(52) U.S. Cl.
CPC .......... *H04L 67/142* (2013.01); *H04L 65/103* (2013.01); *H04L 65/1006* (2013.01);
(Continued)

(58) Field of Classification Search
CPC ................... H04L 65/1009; H04L 67/142
See application file for complete search history.

(56) References Cited

U.S. PATENT DOCUMENTS

| 7,586,857 B2 | 9/2009 | Ejzak et al. | |
|---|---|---|---|
| 2004/0196867 A1* | 10/2004 | Ejzak | H04M 3/56 370/468 |
| 2007/0271388 A1* | 11/2007 | Bowra | H04L 65/602 709/231 |

(Continued)

FOREIGN PATENT DOCUMENTS

| CN | 1534972 A | 10/2004 |
|---|---|---|
| EP | 1 492 303 A2 | 12/2004 |

OTHER PUBLICATIONS

M. Handley et al., "SDP: Session Description Protocol" Network Working Group, 2006, 49 pages.

(Continued)

*Primary Examiner* — Nicholas Taylor
*Assistant Examiner* — Afroza Sultana
(74) *Attorney, Agent, or Firm* — Rothwell, Figg, Ernst & Manabeck, P.C.

(57) ABSTRACT

A first method for controlling a media session involving a plurality of media streams within a communications network, wherein a media control node determines that selected media streams out of the plurality of media streams are associated to each other in a media session, generates an instruction to group the selected media streams of the media session, and transmits the instruction to group the selected media streams to the media resource node, an corresponding second method for initiating a media session involving a plurality of media streams wherein a further media control node determines grouping capabilities of the further media resource node to group selected media streams out of the plurality of media streams generates in dependence said grouping capabilities a session offer comprising an information of grouping the selected media streams, and transmits the session offer to the further media resource controller.

19 Claims, 4 Drawing Sheets

(52) U.S. Cl.
CPC ...... *H04L 65/1043* (2013.01); *H04L 65/1069* (2013.01); *H04L 65/1083* (2013.01); *H04L 65/4015* (2013.01); *H04L 65/80* (2013.01)

(56) References Cited

U.S. PATENT DOCUMENTS

| | | | | |
|---|---|---|---|---|
| 2008/0162714 | A1* | 7/2008 | Pettersson | H04L 65/80 709/231 |
| 2009/0172170 | A1* | 7/2009 | Rey | H04L 29/06027 709/227 |
| 2009/0298521 | A1 | 12/2009 | Finlayson | |
| 2011/0249681 | A1* | 10/2011 | Ayyar | H04L 65/1016 370/401 |
| 2011/0295943 | A1* | 12/2011 | Peuziat | H04L 65/1069 709/203 |
| 2012/0005362 | A1* | 1/2012 | Hayashi | H04L 65/1093 709/231 |
| 2012/0259950 | A1* | 10/2012 | Havekes | H04L 65/4084 709/217 |

OTHER PUBLICATIONS

J. Rosenberg et al., "SIP: Session Initiation Protocol" Network Working Group, 2002, 269 pages.

G. Camarillo et al., "The Session Description Protocol (SDP) Grouping Framework" Internet Engineering Task Force (IETF), 2010, 21 pages.

J. Rey et al.,"RTP Retransmission Payload Format" Network Working Group, 2006, 35 pages.

ITU-T Telecommunication Standardization Sector of ITU, H.248.1, Series H; Audiovisual and Multimedia Systems Infrastructure of audiovisual services—Communication procedures, Gateway control protocol: Version 3, International Telecommunication Union, 2005, 206 pages.

I. Johansson et al., "Simultaneous Media Grouping: draft-johansson-mmusic-grouping-simultaneous-oo" Network Working Group, 2010, 6 pages.

Taylor "Megaco/H.248: A New Standard for Media Gateway Control" IEEE Communications Magazine, IEEE Service Center, 2000, vol. 38, No. 10, pp. 124-132.

Guenkova-Luy et al. "End-to-End Quality-of-Service Coordination for Mobile Multimedia Applications" IEEE Journal on Selected Areas in Communications, IEEE Service Center, 2004, vol. 22, No. 5, pp. 889-903.

Office Action dated Dec. 1, 2015, issued in Chinese Patent Application No. 201180072154.6, 21 pages.

2nd Office Action dated Oct. 17, 2016, issued in Chinese Patent Application No. 201180072154.6, 15 pages.

\* cited by examiner

MEDIA STREAM GROUPING IN MULTIMEDIA COMMUNICATION NETWORKS

TECHNICAL FIELD

The present invention relates to media handling in multimedia communications networks, and specifically relates to an interaction involving a session control protocol and a media gateway protocol.

BACKGROUND

Modern communication networks often show a "decomposed" or layered architecture, in which the call and session control layer and the media plane layer are handled by different instances that are typically realized as separated physical nodes. Typically the nodes of the call and session control layer are referred to as media gateway controllers and the nodes of the media plane layer are referred to as media gateways.

A protocol widely used in the control layer for controlling sessions consisting of one or several media streams is the Session Initiation Protocol SIP being specified in the Internet Engineering Task Force document "IETF RFC 3262, Session Initiation Protocol" in the following being referred to as RFC 3262.

A further protocol defined by the IETF, the Session Description Protocol SDP specified in the IETF document RFC 4566, is used in a variety of networks and communications systems for describing multimedia sessions, e.g. for the purpose of session announcement, session invitation and other forms of multimedia session initiation. Examples of such networks are the IP Multimedia Subsystem—IMS—and the Multimedia Telephony Service—MMTel—. The SDP is thereby used in combination with the SIP in a way that SDP messages or packages are embedded into SIP.

Since its origins, SDP has evolved with new capabilities to respond to the needs of new applications, as corresponds to a constantly growing use of the protocol. A capability to group different media has been specified for different applications in various IETF documents. By means of media grouping in SDP, a particular relationship between two or more media streams can be indicated.

The framework for grouping of media is specified in the IETF document RFC 5888 that also specifies specific applications for the use of this capability, and further in the IETF document RFC 4588 titled "RTP Retransmission Payload Format", and the IETF document "Simultaneous Media Grouping, draft-johansson-mmusic-grouping-simultaneous-00" of Apr. 28, 2010, in the following being referred to as DRAFT SID.

Examples for the use of media grouping are:
Synchronized play-out of the different media streams, using so-called "LS" semantics, (specified in RFC 5888),
Simultaneous media grouping of media streams that constitute different representations of identical content, for example a high resolution and a low resolution of the same video sequence sent to a video conference server using so-called "SID" semantics, (specified in DRAFT SID), and
RTP retransmission, wherein original media and replica of the media are grouped, for increased robustness using so-called "FID" semantics, (as described in RFC 4588)
In essence, the mechanism makes use of the following two attributes:

The mid-attribute is used to identify each of the media blocks within a multiple media SDP session included at media level, i.e. within the m-block:
"a=mid:" identification-tag
The group-attribute is used to indicate which of the media in the multiple media SDP session are grouped and for what purpose, being included at session level, i.e. "above" all m-blocks:
"a=group:" semantics (SP identification-tag)
Further typically, a protocol used between the control nodes and the media plane nodes is specified in ITU-T Recommendation H.248.1, titled Gateway Control Protocol (current Version 3), in the following also being referred to as media gateway control protocol or simply as H.248.

Whereas in SIP, embedded SDP is supported in its entirety (as specified in RCF 4566), the use of SDP in H.248 encounters some difficulties. In other words, it is not always possible to forward a SDP element from SIP to H.248 or vice versa.

Specifically, whereas SIP allows embedding an SDP element comprising a description of a plurality of media and a grouping of the media or of selected media out of the plurality of media, such SDP element cannot be embedded into H.248. The reason is that the different media blocks are separated into different stream descriptors (each referring to one m-block or, in other words, one m-line). Within H.248 each stream of the multiple streams has to be described by a separate stream descriptor. Thus SDP would have to be contained within a so called stream descriptor representing a single, bidirectional media stream.

It is to be noted that, formally, mid attributes could be included in the media blocks. However, lacking the instructions of what kind of grouping is required (in absence of the a=group line), a media gateway (e.g. MRFP) would disregard this information. In other words, current H.248 lacks a means to providing a group attribute having an influence beyond the m-block border.

SUMMARY

It is an object of the present invention to effectively enable a grouping of a plurality of media streams in a decomposed multimedia network comprising a media control layer being separated from a media plane (also being referred to as bearer or connectivity) layer.

This object is achieved by the independent claims. Advantageous embodiments are described in the dependent claims.

According to an embodiment, a media session within a communications network is initiated and/or controlled involving a plurality of media streams, wherein the communications network comprises a plurality of media control nodes e.g. so-called media gateway controllers and a plurality media resource nodes so-called media gateways being controlled by each one of the media control nodes, wherein one of the media control nodes instructs a media resource node being controlled by that media control nodes to associate or group two or more of the media streams, e.g. a subset of all streams handled by a termination of the media resource node.

In an embodiment, the media control node determines that selected media streams out of the plurality of media streams are associated to each other in a media session, generates an instruction to group the selected media streams of the media session, and transmits the instruction to group the selected media streams to the media resource node.

The embodiments of the invention allow a control layer node (a media gateway controller or MRFC) to instruct a node of the media layer (a media gateway or a MRFP), by means of a corresponding session description, to create appropriate media stream sinks and sources (such logical entities also being referred to as terminations within the H.248 terminology) for handling multiple media streams and grouping corresponding two or more of these media streams. Thus controlling a grouping (or association) of different media streams of multimedia applications like videoconference and so-called telepresence might be accomplished involving a plurality of media gateway controllers and a corresponding plurality of media gateways.

In an embodiment, the session description transmitted from the media gateway controller to the media gateway comprises for each media stream an own stream descriptor wherein all media streams are described within one media description.

In an embodiment the grouping instruction is provided by means of a H.248 property e.g. by means of inserting corresponding information in an appropriate message, e.g. into the so-called termination state descriptor provided by the H.248 protocol.

In an embodiment, the session description transmitted from the media gateway controller to the media gateway comprises an indication of a purpose for the grouping.

In an embodiment the media control node receives an offer from a further media control node, wherein the offer comprises a description of the session comprising descriptions of all involved media streams and a grouping information of the selected media streams to be grouped. The offer might be an SDP offer according to IETF RFC 4566.

It is to be noted that a session description in SDP may comprise more than one type of media, for example an audio and a video stream, wherein each type of media is described by a so called "m block" which is represented by an m-line and its corresponding attributes.

In a further embodiment, a mechanism or method is provided to perform a mapping of the a=group attribute of the SDP offer with its corresponding instructions into information suitable to be sent in the H.248 protocol.

In an alternative embodiment, a grouping instruction is provided to the media layer by sending an appropriate Signal Descriptor (i.e. by sending a Signal Descriptor comprising the grouping instruction) according to the H.248 protocol.

According to embodiments of the invention, telecommunications applications like video conference, telepresence systems, are enabled to perform a grouping in a layered architecture having separate media control and media connectivity layers, e.g. by applying a mapping of information elements of the Session Description Protocol into as mentioned in the introductory section.

In a further embodiment, in a videoconference scenario, a grouping is performed comprising a high quality video and a standard quality video of the same content to be simultaneously transmitted to the same participant e.g. to suit different capabilities of different receivers of this participant.

In a further embodiment, a video streaming application sends original media and a replica being grouped in order to increase robustness and/or the quality.

The present invention also concerns computer programs comprising portions of software codes in order to implement the method as described above when operated by a respective processing unit of a user device and a recipient device. The computer program can be stored on a computer readable medium. The computer-readable medium can be a permanent or rewritable memory within the user device or the recipient device or located externally. The respective computer program can be also transferred to the user device or recipient device for example via a cable or a wireless link as a sequence of signals.

In the following, detailed embodiments of the present invention shall be described in order to give the skilled person a full and complete understanding. However, these embodiments are illustrative and not intended to be limiting.

DETAILED DESCRIPTION

Figure 1:
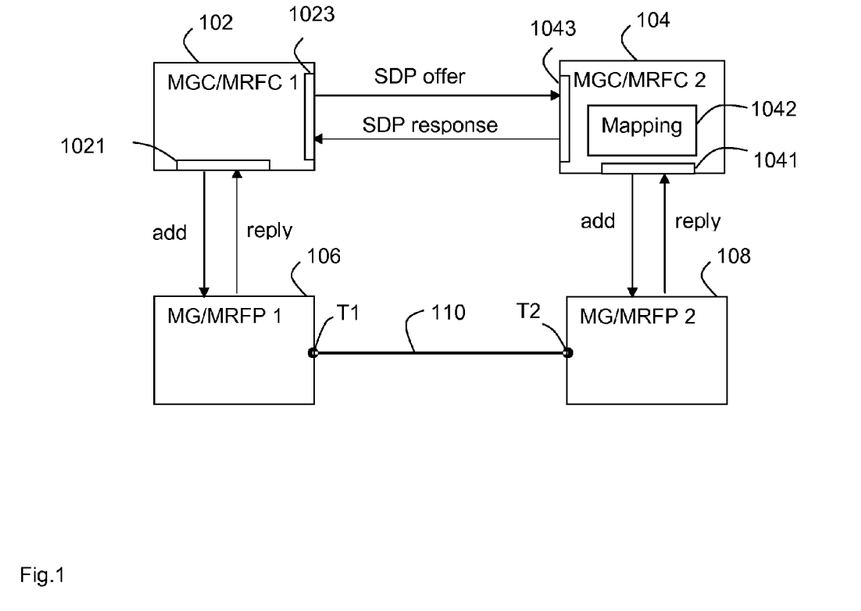
FIG. 1 shows a principle block diagram comprising nodes being involved in a media control being performed on the basis of SDP and H.248.

FIG. 1 shows a principle block diagram of a part of a multimedia communications network, by way of example comprising a first media resource controller (or media gateway controller) 102, a second media resource controller 104, a first resource point (or media gateway) 106 and a second resource point 108. By way of example, first resource point 106 comprises a first termination T1 and second resource point 108 comprises a second termination T2 that are coupled to each other to form a communication channel 110 within the media layer. By way of example, first media resource controller 102 and second media resource controller 104 communicate by means of above-mentioned SIP protocol and first (second) media resource controller 102 (104) communicates with first (second) resource point 106 (108) by means of a protocol according to H.248 enhanced according to embodiments to the invention (also being referred to as enhanced H.248 in the following).

Each termination T1 and T2 might be a media stream sink and/or media stream source that might each be characterized by address(es) (e.g. an IP address), port number(s) and type(s) of media. By way of example, the first media resource controller 102 sends a command (e.g. "add") to the first resource point 106 to instruct a creation of the first termination T1 for handling a plurality of (e.g. three) media streams, wherein all these media streams or a subset of these media streams (e.g. two of the three media streams) are to be grouped together. This command might be provided by means of an enhanced H.248 command as described under FIG. 2 in more details. The first resource point 106 might acknowledge the command by a reply (e.g. "add reply"). Additionally, first media resource controller 102 sends a corresponding offer (e.g. "SDP offer") comprising a corresponding session description comprising a description of the plurality of media and the grouping information to the second media resource controller 104. The second media resource controller 104 might accept the offer by a reply (e.g. "SDP answer"). Corresponding to the communication between the first media resource controller 102 and the first resource point 106, the second media resource controller 104 generates a command (e.g. "add") to creating the second termination T2 on the basis of the SDP offer received from the first media resource controller 102.

Figure 2:
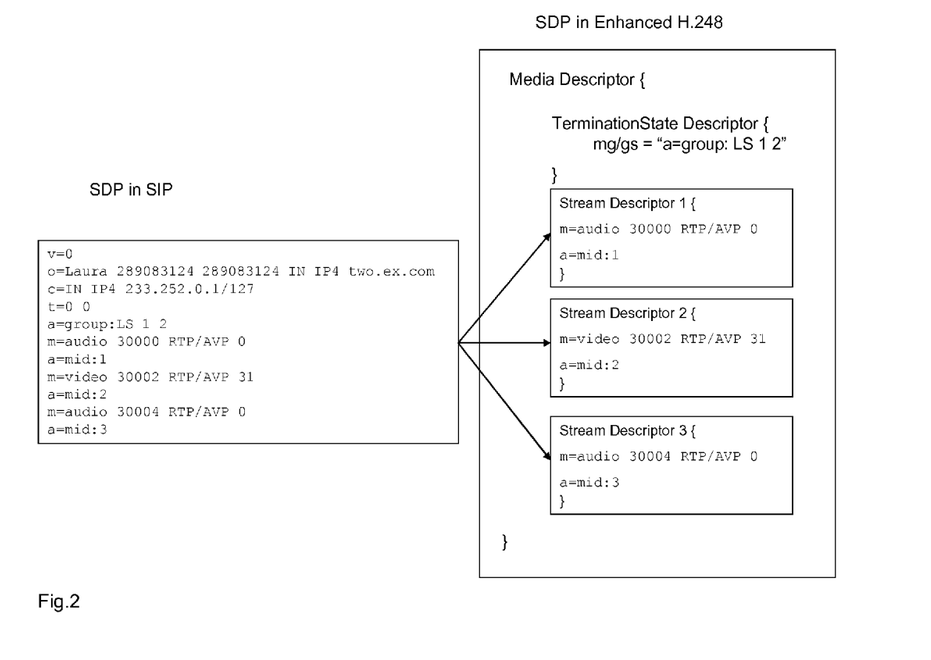
FIG. 2 shows a principle diagram illustrating a mapping of controlling information from SDP to H248 according to the invention.

Further, FIG. 2 depicts the second resource controller 104 comprising a first interface (circuit) 1041 for providing an SDP interface to the first media resource controller 102, and a second interface (circuit) 1043 for providing an H.248 interface to the second resource point 108.

Similarly, FIG. 2 depicts corresponding interface circuits 1021 and 1023 of the first resource controller 102.

In the following, the second media resource controller 104 will be explained in more details. By way of example, the second media resource controller 104 comprises a translation or mapping unit 1042 for performing a mapping of the session description carried by the offer received from the first media resource controller 102. The mapping unit detects the plurality of media and the grouping information from the offer, determines that these (or some of these) media are associated to a second termination T2 and generates an instruction comprising a media stream description of all involved media (Stream Descriptors) and a grouping information as part of a termination state description associated to the second termination. In other words, the mapping performs a translation from the media offer received from the first media resource controller 102 to an instruction to be transmitted to the (second) resource point 108.

Thus the media resource controller receiving an SDP offer is able to correctly instruct the associated media resource point 108 to perform the grouping indicated in the SDP offer.

The above-mentioned mapping of the first media resource controller 102 will be described in more details in the following FIG. 2. FIG. 2 by way of example illustrates a SIP/SDP session description and a translation or mapping according to the aforementioned (enhanced) H.248 protocol.

FIG. 2 shows on the left hand side a session description that may be received in a SDP offer in a media resource controller (e.g. the second media resource controller 104 of FIG. 1). According to the above example, the session description comprises session attributes as part of a session description level (upper lines including by way of example the line a=group: LS 1 2) and media descriptions as part of a media description level (lower lines) describing the following three media streams or media instances: a video stream (m=video 30002 RTP/AVP 31), a first audio stream (m=audio 30000 RTP/AVP 0), and second audio stream (m=audio 30004 RTP/AVP 0) e.g. containing the simultaneous translation into another language.

On the session description level, the description makes use of the SIP/SDP grouping capability. In the example shown here, a grouping of the video stream and one of the voice streams is described. By way of example these media streams shall be grouped for play-out synchronization (so-called lip synchronization). This is indicated by the line "a=group: LS 1 2" comprising lip synchronization—LS— token in the group attribute, thus synchronizing the first audio (1) and the video (2)) in this example.

Thereto, FIG. 2 shows on the right hand side enhanced H.248 command allowing the media resource controller to create a termination in the associated media resource point to handle these three media streams by corresponding stream descriptions, and to further provide instructions to the media resource point, which media streams are to be grouped and for what purpose the grouping is applied, e.g. in a multiple media session.

The instructions are given by means of a media description "Media Descriptor" at termination level "Termination State Descriptor" in order to encompass all streams defined for the termination. The Termination State Descriptor comprises the grouping instruction (mg/gs="a=group: LS 1 2") and the three separate media stream descriptions according to the SDP offer (Stream Descriptor 1, Stream Descriptor 2, Stream Descriptor 3) including each one media block. Thus, the Media Descriptor contains all the Stream Descriptors for a termination including the grouping instruction, and each Stream Descriptor contains the actual parameters for the corresponding media stream descriptions (e.g. media instance (video, audio, . . . ), size of the stream, codec etc.)

As already mentioned above, alternatively to the grouping information embodied in the Media Descriptor, the grouping information might be embodied in an appropriate H.248 Signal Descriptor to be sent to the media resource point.

Figure 3:
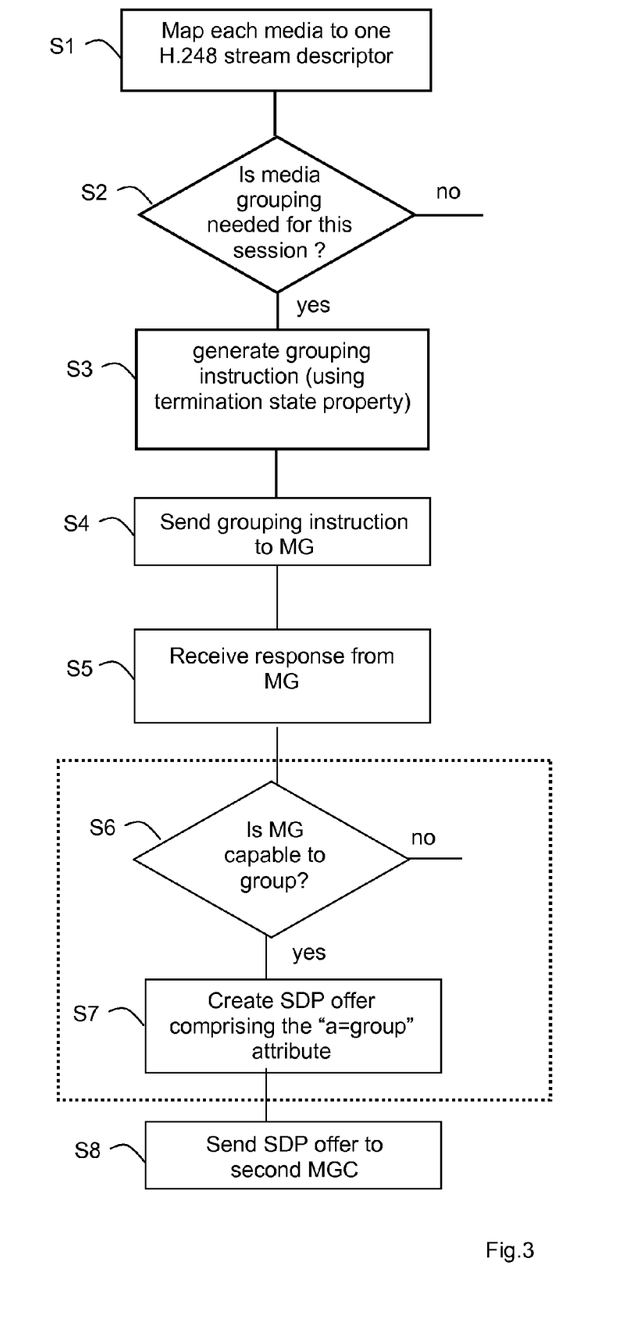
FIG. 3 shows a first flow chart for illustrating an exemplary method of generating a session offer to be performed by an initiating control node.

Referring to an above-described embodiment, the grouping information is expressed as property to be defined in the terminationState descriptor. In its simplest way and by way of example, this property can be expressed as a character string with the same content as the a=group attribute. The way to define new properties in H.248 is proposed to be provided by means of a new package. An exemplary excerpt of the proposed package might be sketched as follows:

A. SDP Media Grouping Package
   Package Name: Media Grouping
   Package ID: mg, 0x???? (to be defined by ITU-T/IANA)
   Description: This package allows the MGC to instruct the
      MG to group media streams defined in different stream
      descriptors
   Version: 1
   Extends: None
A.1 Properties
A.1.1 GroupSemantics
   Property Name: GroupSemantics
   PropertyID: sdpgs, (0x0001)
   Description: This property allows the MGC to instruct the
      MG to group media streams defined in different stream
      descriptors
   Type: String
   Possible values: As per the a=group attribute in [RCF
      5888]
   Default: None
   Defined in: TerminationState
   Characteristics Read/Write FIG. 3 shows an exemplary flow chart illustrating a generation of an SDP offer with a (multimedia) session description in response to grouping capabilities of a controlled media resource point according to FIG. 1:

In a first step S1, the first media resource controller 102 (or any other node associated to the first media resource controller 102) maps the media of a multimedia session to each one H.248 stream descriptor.

In a second step S2, the first media resource controller 102 determines, if a media grouping is needed (or recommended) for this multimedia session.

If yes, in a third step S3, the first media resource controller 102 generates a grouping instruction to group a plurality of media to be handled by a certain termination of the controlled media resource point, in the following being referred to as the first termination T1 of the first media resource point 106, using the mg/gs TerminationState property.

In a fourth step S4, the first media resource controller 102 sends a command (add) to the first media resource point 106 comprising the generated grouping instruction.

In a fifth step S5, the first media resource controller 102 receives a reply from to the first media resource point 106 in response to the add command.

In a sixth step S6, first media resource controller 102 detects from the reply, if the first media resource point 106 is capable to perform the instructed grouping. If not, no SDP offer comprising such grouping is generated.

If yes, in a seventh step S7, an SDP offer is generated comprising the "a=group" attribute.

In an eighth step S8, the SDP offer is sent to a peer media resource controller, in the following being referred to as the second media resource controller 104.

Figure 4:
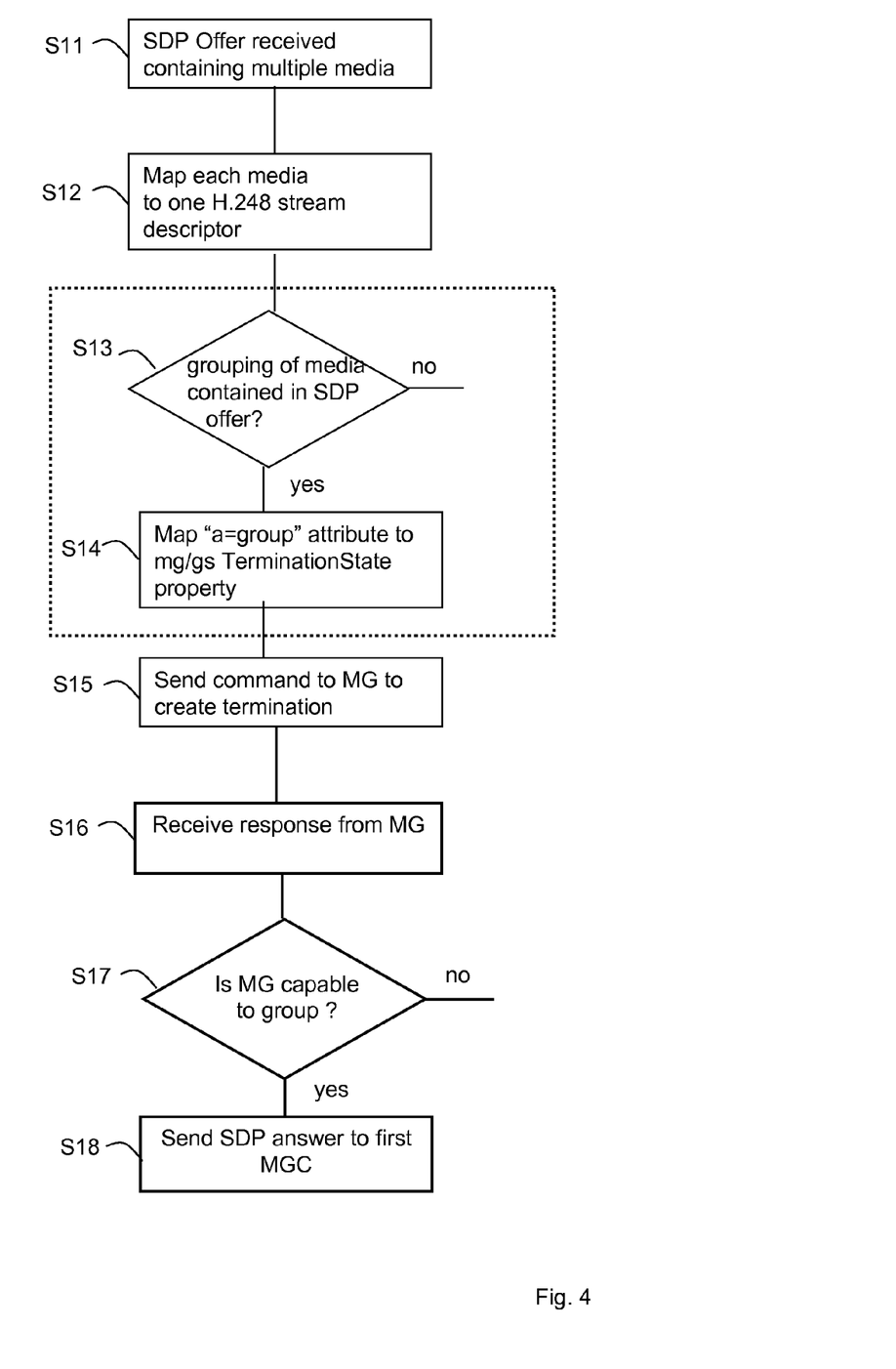
FIG. 4 shows a second flow chart for illustrating an exemplary method of the mapping of FIG. 2 to be performed by a further control node responding to the session offer.

An equivalent method might apply to a media resource controller receiving the SDP offer. Thereto, FIG. 4 shows an exemplary flow chart of eight steps, being referred to as steps S11-S18, illustrating a generation of a media grouping command (Media Descriptor) comprising a mapping of media control information comprised by a (multimedia) session description within the SDP offer received from the first media resource controller 102:

In a first step S11 (of this method), the second media resource controller 104 receives an SDP offer involving multiple media and potentially comprising media grouping information, e.g. the SDP offer generated by the first media resource controller 102 by the steps of FIG. 3.

In a second step S12, each media is mapped (e.g. by the mapping unit) to one H.248 stream descriptor.

In the following two steps S13 and S14 (steps within the dotted rectangle) the MGC provides instructions to an appropriate media resource point to apply the media grouping, e.g. to the second media resource point 108 of FIG. 1, in the following also being referred to as media gateway or MG:

In the third step S13, the mapping unit detects, if a grouping of media is comprised in the SDP offer. If not, no grouping will be instructed.

If yes, in the fourth step S14, the "a=group" attribute is mapped to the mg/gs termination state property of the Media Descriptor.

In a fifth step S15, such mapped Media Descriptor is sent to the second media resource point 108 in order to generate a corresponding termination.

In a sixth step S16, the second media resource controller 104 receives a corresponding response from the second media resource point 108.

In a seventh step 17, the second media resource controller 104 determines from the response, whether the second media resource point 108 is capable to perform the instructed grouping.

If yes, in an eighth step 18, the second media resource controller 104 sends a (positive) SDP answer to the first media resource controller 102.

The multimedia session can now be performed employing the grouping initiated by the first media resource controller 102.

Additionally, the media resource controller—MGC—might inform the media resource point—MG— for which purpose the media streams are grouped. For example, if the MG is an MRFP in a HD videoconference or in a telepresence conference, and media grouping is used to group two media of the same scene encoded with different precision (e.g. HD and SD), it can be advantageous to let the MRFP know the purpose, so that the MRFP forwards only SD media to any participant whose device does not support the HD media, while the HD or both HD and SD are forwarded to other participants supporting both.

According to above-described embodiments, for instructing the MG, a protocol is used wherein the media streams are described each in an own attribute description (Stream Descriptor), all of them within one single same media description (Media Descriptor). The media description comprises the grouping information (a=group line) that enables the MG to create the corresponding termination. It is to be noted that the impact of the grouping for the respective termination might be dependent on the grouping semantics; in many cases the grouping means for the termination to perform a grouping action, e.g. synchronizing of streams. In other cases, the grouping may be transparent for the termination and only relevant for the end device.

In the following a mapping of group attributes in H.248 is exemplarily described in more details.

A media gateway controller MGC that sends or receives SDP grouping related attributes in an SDP Offer/Answer dialogue should map those attributes as follows when sending the command to the MG:

Each m-block is mapped into one Stream Descriptor.

The a=mid attribute of each m-block is included in the Local/Remote Descriptor of the corresponding Stream Descriptor, together with the rest of the attributes of the m-block The a=group attribute is mapped to the sdpmg/sdpgs property and included in the TerminationState Descriptor. The content of the property, a string, should be a copy of the a-line that contains the a=group attribute.

In the following two examples are sketched:

In a first example, the MGC receives an SDP offer comprising three video streams with the following media description:

```
a=group: SID 1 2 3
m=video 52738 RTP/AVP 99
i=Large size 1280x720 send-only video
a=mid:1
a=rtpmap:99 H264/90000
a=fmtp:99 profile-level-id=4DC01F; sprop-parameter-sets=
Z0LAH5ZkAoAt0IAAAAMAgAAAHkeMGVA=,aM48gA==
b=AS:1000
a=sendonly
m=video 52740 RTP/AVP 100
i=Medium size 640x360 send-only video
a=mid:2
a=rtpmap:100 H264/90000
a=fmtp:100 profile-level-id=4DC016; sprop-parameter-sets=
Z0LAHpZkBQF/ywgAAAAMACAAAAwHkeLF1,aM48gA==
b=AS:350
a=sendonly
m=video 52742 RTP/AVP 101
i=Small size 256x144 send-only video
a=mid:3
a=rtpmap:101 H264/90000
a=fmtp:101 profile-level-id=42C00B; sprop-parameter-sets=
Z0LADJZkCAnQgAAAAwCAAAAeR4oVUA==,aM48gA==
b=AS:128
a=sendonly
```

The three video streams might represent a common recording in a conference room sent with different resolution. To indicate that they carry identical media the "SID" (Simultaneous (stream) Identity) grouping semantics is used (DRAFT SID). This scenario is typical for a high quality video-conference or a telepresence system.

The MGC maps this description into the following Media Description to be conveyed to an appropriate MG:

```
Media {
  TerminationState { sdpmg/sdpgs = "a=group: SID 1 2 3"},
  Stream = 1 {
    Remote {
      m=video 52738 RTP/AVP 99
      i=Large size 1280x720 send-only video
      a=mid:1
      a=rtpmap:99 H264/90000
      a=fmtp:99 profile-level-id=4DC01F; sprop-parameter-sets=
      Z0LAH5ZkAoAt0IAAAAMAgAAAHkeMGVA=,aM48gA==
```

```
        b=AS:1000
        a=sendonly
      }
    },
    Stream = 2 {
      Remote {
        m=video 52740 RTP/AVP 100
        i=Medium size 640x360 send-only video
        a=mid:2
        a=rtpmap:100 H264/90000
        a=fmtp:100 profile-level-id=4DC016; sprop-parameter-sets=
  Z0LAHpZkBQF/ywgAAAMACAAAAwHkeLF1,aM48gA==
        b=AS:350
        a=sendonly
      }
    },
    Stream = 3 {
      Remote {
        m=video 52742 RTP/AVP 101
        i=Small size 256x144 send-only video
        a=mid:3
        a=rtpmap:101 H264/90000
        a=fmtp:101 profile-level-id=42C00B; sprop-parameter-sets=
  Z0LADJZkCAnQgAAAAwCAAAAeR4oVUA==,aM48gA==
        b=AS:128
        a=sendonly
      }
    }
}
```

In an embodiment, a similar mapping applies to the Local Descriptor. The Local Descriptor is not shown here, but might also be part of the Media Descriptor to be sent to the media gateway MG.

The following second example also corresponds to a video conference system. The MGC receives an SDP offer by way of example concerning one audio media stream and two video streams. The two video streams are e.g. grouped with the "FID" grouping semantics one of them representing the original video stream and the other representing a replica being sent for increased robustness [IETF RFC 4588]. The replica might be sent only on request from the receiver.

The SDP received in the SDP offer:

```
a=group:FID 2 3
m=audio 49170 RTP/AVPF 96
a=rtpmap:96 AMR/8000
a=fmtp:96 octet-align=1
a=rtcp-fb:96 nack
a=mid:1
m=video 49174 RTP/AVPF 98
a=rtpmap:98 MP4V-ES/90000
a=rtcp-fb:98 nack
a=fmtp:98 profile-level-id=8;config=0101000001200088400 6682C209\
0A21F
a=mid:2
m=video 49176 RTP/AVPF 99
a=rtpmap:99 rtx/90000
a=fmtp:99 apt=98;rtx-time=3000
a=mid:3
```

The MGC by way of example maps the offer into the following Media Descriptor:

```
Media {
  TerminationState { sdpmg/sdpgs = "a=group: FID 2 3"},
  Stream = 1 {
    Remote {
      m=audio 49170 RTP/AVPF 96
      a=rtpmap:96 AMR/8000
      a=fmtp:96 octet-align=1
      a=rtcp-fb:96 nack
      a=mid:1
    }
  },
  Stream = 2 {
    Remote {
      m=video 49174 RTP/AVPF 98
      a=rtpmap:98 MP4V-ES/90000
      a=rtcp-fb:98 nack
      a=fmtp:98 profile-level-id=8;config=0101000001200088400 6682C209\
0A21F
      a=mid:2
    }
  },
  Stream = 3 {
    Remote {
      m=video 49176 RTP/AVPF 99
      a=rtpmap:99 rtx/90000
      a=fmtp:99 apt=98;rtx-time=3000
      a=mid:3
    }
  }
}
```

A handling of certain error situations, like a=mid attribute not present in all m-blocks or contents of the sdpmg/sdpgs referring to not found mid values might be provided.

The invention claimed is:

1. A method for controlling a media session involving a plurality of media streams within a communications network, wherein the communications network comprises a first Multimedia Resource Function Processer (MRFP) and a first Multimedia Resource Function Controller (MRFC) configured to control the first MRFP, wherein the method comprises the following steps performed by the first MRFC:
the first MRFC evaluating a session offer received from a second MRFC, wherein the session offer is received in order to accomplish the media session;
the first MRFC determining that a first selected media stream and a second selected media stream out of the plurality of media streams are associated to each other in the media session;
the first MRFC generating an instruction to group the first selected media stream and the second selected media stream, wherein the instruction includes a description packet comprising (i) a media descriptor for the media session, (ii) a first identifier for the first selected media stream, and (iii) a second identifier for the second selected media stream, and wherein the first identifier and the second identifier are described within the media descriptor;
the first MRFC transmitting the instruction to group the first selected media stream and the second selected media stream to the first MRFP; and
the first MRFC receiving a reply transmitted by the first MRFP in response to the instruction to group the first selected media stream and the second selected media stream, wherein the reply comprises an indication whether the first MRFP is capable of grouping the first selected media stream and the second selected media stream.

2. The method of claim 1, wherein the plurality of media streams of the media session is associated to a termination of the first MRFP, said termination being at least one of a media stream source and a media stream sink.

3. The method of claim 1, wherein the instruction to group the plurality of selected media streams comprises an information of a kind of grouping.

4. The method of claim 1, wherein the description packet is sent in a suite of one or a plurality of H.248.1 descriptions for instructing a generation of a media termination (T2) at the first MRFP.

5. The method of claim 1, wherein the session offer received from the second MRFC is a Session Description Protocol offer, SDP offer, according to IETF RFC 4566.

6. The method of claim 5, further comprising:
the first MRFC detecting a plurality of media stream description blocks of the SDP offer and mapping each block into one separate media stream descriptor; and
the first MRFC detecting a group attribute of the SDP offer describing a mapping of the selected media streams and associating the group attribute to a termination state descriptor.

7. The method of claim 1, wherein the plurality of selected media streams to be grouped comprises a high definition video and standard definition video associated to each other to suit capabilities of different receivers.

8. The method of claim 1, wherein the plurality of selected media streams to be grouped comprises an original digital representation and a replica representation.

9. The method of claim 8, wherein the replica representation is sent on request from a receiver.

10. The method of claim 1, wherein the instruction is indicative of a purpose for the grouping.

11. A method for initiating a media session involving a plurality of media streams within a communications network, wherein the communications network comprises a first Multimedia Resource Function Processor (MRFP) and a first Multimedia Resource Function Controller (MRFC) configured to control the first MRFP, wherein the method comprises the following steps performed by the first MRFC:
the first MRFC detecting that the first MRFP is capable of grouping a first selected media stream and a second selected media stream of the plurality of media streams;
based on detecting that the first media resource node is capable of grouping the first selected media stream and the second selected media stream of the media session, the first MRFC generating a session offer comprising: (i) a grouping instruction to group the first selected media stream and the second selected media stream, (ii) parameters regarding the first selected media stream, and (iii) parameters regarding the second selected media stream; and
the first MRFC transmitting the session offer to a second MRFC such that the second MRFC instructs a second MRFP to group the first selected media stream and the second selected media stream based on the grouping instruction.

12. The method of claim 11, wherein instructing the second MRFP comprises:
sending a command to the second MRFP comprising an instruction to group the first selected media stream and the second selected media stream, and
receiving a capability reply from the second MRFP in response to the command to be evaluated for determining the grouping capabilities.

13. A media control node for initiating a media session involving a plurality of media streams within a communications network, wherein the media control node is a first Multimedia Resource Function Controller (MRFC) configured to control a first Multimedia Resource Function Processor (MRFP), the media control node comprising:

a processor for detecting that the first MRFP is capable of grouping a first selected media stream and a second selected media stream of the plurality of media streams, and
based on detecting that the first media resource node is capable of grouping the first selected media stream and the second selected media stream of the media session, generating a session offer comprising: (i) a grouping instruction to group the first selected media stream and the second selected media stream, (ii) parameters regarding the first selected media stream, and (iii) parameters regarding the second selected media stream; and
a transmitter for transmitting the session offer to a second MRFC such that the second MRFC instructs a second MRFP to group the first selected media stream and the second selected media stream based on the received grouping instruction.

14. A media control node for controlling a media session involving a plurality of media streams within a communications network by transmitting instructions to a media resource node, wherein the media control node is a first Multimedia Resource Function Controller (MRFC) configured to control a first Multimedia Resource Function Processor (MRFP), the media control node comprising:
a processor for evaluating a session offer received from a second wherein the session offer is received in order to accomplish the media session, and
for determining that a first selected media stream and a second selected media stream out of the plurality of media streams are associated to each other in a media session, and
for generating an instruction to group the first selected media stream and the second selected media stream, wherein the instruction includes a description packet comprising (i) a media descriptor for the media session, (ii) a first identifier for the first selected media stream, and (iii) a second identifier for the second selected media stream, and wherein the first identifier and the second identifier are described within the media descriptor;
a transmitter for transmitting the instruction to group the first selected media stream and the second selected media stream to the first MRFP; and
receiving a reply transmitted by the first MRFP in response to the instruction to group the first selected media stream and the second selected media stream, wherein the reply comprises an indication whether the first MRFP is capable of grouping the first selected media stream and the second selected media stream.

15. A non-transitory computer program loadable into the processor of the media control node of claim 14, the computer program comprising code adapted to execute the method.

16. A non-transitory computer program loadable into the processor of the media control node of claim 13, the computer program comprising code adapted to execute the method.

17. A communications network comprising:
a first media control node for initiating a media session involving a plurality of media streams within the communications network, wherein the first media control node is a first Multimedia Resource Function Controller (MRFC) configured to control a first Multimedia Resource Function Processor (MRFP), the first media control node comprising:

a processor for detecting that the first MRFP is capable of grouping a first selected media stream and a second selected media stream of the plurality of media streams, and based on detecting that the first media resource node is capable of grouping the first selected media stream and the second selected media stream of the media session, generating a session offer comprising: (i) a grouping instruction to group the first selected media stream and the second selected media stream, (ii) parameters regarding the first selected stream, and (iii) parameters regarding the second selected media stream;

a transmitter for transmitting the session offer to a second MRFC such that the second MRFC instructs a second MRFP to group the first selected media stream and the second selected media stream based on the grouping instruction; and a second media control node for controlling a media session involving a plurality of media streams within the communications network by transmitting instructions to a media resource node, wherein the second media control node is the second MRFC configured to control the second MRFP, the second media control node comprising:

a processor for evaluating the session offer received from the first MRFC, wherein the session offer is received in order to accomplish the media session, for determining that the first selected media stream and the second selected media stream out of the plurality of media streams are associated to each other in a media session and for generating an instruction to group the first and second selected media streams of the media session;

a transmitter for transmitting the instruction to group the first selected media stream and the second selected media stream to the first MRFP; and a receiver for receiving a reply transmitted by the second MRFP in response to the instruction to group the first selected media stream and the second media stream, wherein the reply comprises an indication whether the second MRFP is capable of grouping the first selected media stream and the second selected media stream.

18. The method of claim 3, wherein the information of the kind of grouping includes one or more of synchronized play out of media streams, alternative play out of media streams, and alternative play out of media streams in response to a user instruction.

19. The method of claim 1, further comprising:

the first MRFC determining that the first MRFP is capable of grouping the first selected media stream and the second selected media stream based on the received indication; and as a result of determining that the first MRFP is capable of grouping the first selected media stream and the second selected media stream, the first MRFC sending a positive SDP response to the second MRFC.

* * * * *